(12) United States Patent
Götz et al.

(10) Patent No.: US 9,330,552 B2
(45) Date of Patent: May 3, 2016

(54) DETECTION OF ICE ON A VEHICLE WINDOW BY MEANS OF AN INTERNAL TEMPERATURE SENSOR

(75) Inventors: Mario Götz, Jettingen (DE); Armin Vogl, Obergriesbach (DE); Helmut Steurer, Gerolsbach-Junkenhofen (DE); Dionisie-Catalin Iordachescu, Rimnicu Vilcea (RO)

(73) Assignees: Conti Temic Microelectronic GmbH, Nürnberg (DE); Continental Automotive GmbH, Hannover (DE)

( * ) Notice: Subject to any disclaimer, the term of this patent is extended or adjusted under 35 U.S.C. 154(b) by 378 days.

(21) Appl. No.: 14/111,014

(22) PCT Filed: Mar. 30, 2012

(86) PCT No.: PCT/DE2012/010083
§ 371 (c)(1),
(2), (4) Date: Nov. 20, 2015

(87) PCT Pub. No.: WO2012/139560
PCT Pub. Date: Oct. 18, 2012

(65) Prior Publication Data
US 2016/0078736 A1    Mar. 17, 2016

(30) Foreign Application Priority Data

Apr. 14, 2011   (DE) .......................... 10 2011 017 085
Jun. 27, 2011   (EP) ..................................... 11464005

(51) Int. Cl.
G08B 21/02    (2006.01)
G08G 1/16     (2006.01)
(Continued)

(52) U.S. Cl.
CPC .............. *G08B 21/02* (2013.01); *B60Q 9/008* (2013.01); *G01S 15/93* (2013.01); *G01S 15/931* (2013.01);
(Continued)

(58) Field of Classification Search
None
See application file for complete search history.

(56) References Cited

U.S. PATENT DOCUMENTS 4,391,373 A * 7/1983 Wiggins ............. G01N 21/9054
                                                209/526
6,466,036 B1 * 10/2002 Philipp .................... G01D 5/24
                                                324/658
(Continued)

FOREIGN PATENT DOCUMENTS

DE    197 55 008    7/1999
DE    199 56 089    6/2001
(Continued)

OTHER PUBLICATIONS
International Search Report corresponding to application PCT/DE2012/100083 dated Jul. 19, 2012.
(Continued)

*Primary Examiner* — Mohamed Barakat
(74) *Attorney, Agent, or Firm* — RatnerPrestia

(57) ABSTRACT

The invention relates to a method for adapting the signal processing of at least one sensor device arranged behind a window in a motor vehicle, wherein the adaptation of the signal processing comprises changing at least one detection threshold value if a probability of ice being on the window is detected on the basis of a determined temperature, characterized in that a temperature signal of at least one temperature sensor integrated in the sensor device is used to detect the probability of ice on the window.

9 Claims, 2 Drawing Sheets

Figure 1:
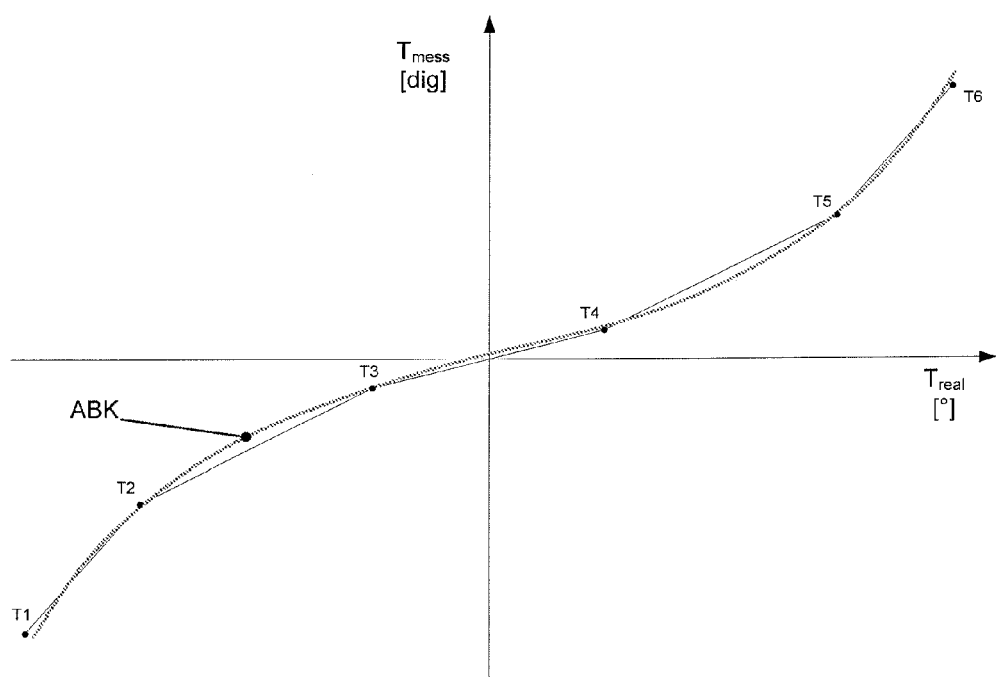

(51) Int. Cl.
*B60Q 9/00* (2006.01)
*G01S 15/93* (2006.01)
*B60S 1/08* (2006.01)
*B64D 15/20* (2006.01)
*B60R 16/023* (2006.01)

(52) U.S. Cl.
CPC ............... *G08G 1/16* (2013.01); *G08G 1/165* (2013.01); *B60R 16/0232* (2013.01); *B60S 1/0866* (2013.01); *B64D 15/20* (2013.01); *E05Y 2900/55* (2013.01)

(56) References Cited

U.S. PATENT DOCUMENTS

| | | |
|---|---|---|
| 6,686,992 B2 | 2/2004 | Wakabayashi |
| 8,265,872 B2 | 9/2012 | Kataoka |
| 2001/0050766 A1 | 12/2001 | Wakabayashi et al. |
| 2005/0030529 A1 | 2/2005 | Schuler et al. |
| 2005/0231339 A1 | 10/2005 | Kudo |
| 2006/0288642 A1* | 12/2006 | Marentette .............. E05F 15/41 49/26 |
| 2007/0076897 A1* | 4/2007 | Philipp ................ H04R 1/1041 381/74 |
| 2007/0232448 A1* | 10/2007 | Linden ............... B60K 31/0008 477/183 |
| 2009/0085797 A1* | 4/2009 | Wise ....................... G01S 7/354 342/198 |
| 2010/0299025 A1* | 11/2010 | Oishi .................... B60S 1/0818 701/36 |
| 2012/0032838 A1 | 2/2012 | Heilmann et al. |

FOREIGN PATENT DOCUMENTS

| | | |
|---|---|---|
| DE | 101 17 397 | 10/2002 |
| DE | 10 2004 012 157 | 9/2005 |
| DE | 10 2004 048 346 | 4/2006 |
| DE | 10 2009 032 506 | 2/2010 |
| DE | 10 2008 030 611 | 7/2010 |
| DE | 10 2009 001 239 | 9/2010 |
| JP | 63180514 | 7/1988 |
| JP | 06258713 | 9/1994 |
| JP | 08011654 | 1/1996 |
| JP | 2001349961 | 12/2001 |
| JP | 2007058805 | 3/2007 |
| JP | 2010064513 | 3/2010 |

OTHER PUBLICATIONS

German Search Report corresponding to application DE 10 2011 017 085.5, dated Jan. 9, 2012.
Japanese Office Action mailed Feb. 3, 2016 for Japanese Application No. 2014-504158.

* cited by examiner

DETECTION OF ICE ON A VEHICLE WINDOW BY MEANS OF AN INTERNAL TEMPERATURE SENSOR

Today, driver assistance systems including sensor devices are increasingly being used in motor vehicles. Said sensor devices serve, for example, to measure distances or speed, and for this purpose comprise in particular at least one transmission unit for emitting light or electromagnetic radiation, for example in the infrared range, into an area of observation and at least one receiving unit for receiving the light reflected on/by objects within said area of observation. Such sensor devices are typically mounted behind an inclined transparent windowpane such as the windscreen. If distance sensors, in particular a CV (Closing Velocity) sensor, are used, e.g. in order to avoid rear-end collisions in a limited speed range or to adapt the own speed to that of a vehicle ahead, the intensity of reflected light is used to qualify or classify an object (also referred to as target) located in the area of observation as a relevant obstacle (relevant object).

If, however, the windowpane behind which the sensor device is arranged is covered with ice, at least part of the light emitted by the sensor device will be radiated in directions that are not within the original and intended emission area of the sensor device. This effect is also referred to as stray light effect. As a result of unintended radiation of the emitted light, e.g. upwards, due to stray light effects, reflectors mounted in the ceilings of parking garages or in underpasses will, for example, be interpreted as relevant obstacles, even if they are not located in the travel corridor (travel path) of the vehicle. They produce so-called false positives (imaginary objects), i.e. events that cause a driver assistance system, for example an ACC (Adaptive/Active Cruise Control) system and/or a braking assistance system, to brake the vehicle although braking is not necessary.

In this context, a significant feature of said stray light effects is that the intensity of the reflected light, in particular that from the imaginary objects, is mostly just above the relevance threshold, i.e. only slightly exceeds the threshold from which an object is qualified as a relevant obstacle due to the intensity of the reflected light. Therefore, one approach to suppressing or avoiding at least part of such stray light effects caused by an icy windowpane consists in assessing whether in principle there is a probability that a windowpane is covered with ice, employing suitable methods or devices. If e.g. the outdoor temperature and therefore the probability of an icy windscreen are known, for example in case of temperatures below zero degrees, the relevance or intensity threshold which must be exceeded by the reflected light in order for the sensor device or an associated evaluation unit to classify an object or a target as a relevant object can be increased, e.g. in case of negative temperature values, so that most of the imaginary objects (false positives) resulting from stray reflections (i.e. due to stray light effects) are disregarded or not qualified as relevant objects. Such a change of one or more intensity threshold(s) of the sensor device is in particular accompanied by a general reduction of the sensitivity of the sensor device, which finally reduces the number of use cases that are solved with sufficient success. Use cases are, for example, cases where the vehicle is braked automatically, in particular by a braking assistant, due to an obstacle detected by the sensor device. A use case is successfully solved or, in other words, optimally solved if the vehicle subjected to automatic braking stops at a predefined distance from the obstacle. The predefined distance can be 0.5 to 1 m, in accordance with the speed range in which braking was effected. A use case that is solved with sufficient success is preferably a case where automatic braking avoids contact with the obstacle although the predefined distances cannot be achieved. For example, travelling at a speed of 20 km/h, i.e. in a 20 km/h use case, the vehicle cannot stop 90 cm, but only 20 cm, away from the obstacle. The case (use case) is still successfully solved or solved with sufficient success in this case (no collision occurred), but the desired distance could not be achieved at the end of the braking intervention.

To date, the problem described above has been solved by means of outdoor temperature sensors, wherein a less sensitive calibration, i.e. higher intensity or relevance thresholds, is typically used as long as the outdoor temperature has negative temperature values. In a modification, the less sensitive calibration is activated in case of negative temperatures and continues only for a defined time.

The object of the invention is to provide a method and a device for a robust and reliable detection of ice or the probability of ice on a vehicle window, and to propose a suitable adaptation of the signal processing of a sensor device arranged behind the vehicle window.

The aforesaid object is achieved according to the independent claims.

A central idea of the invention consists in using a temperature signal to detect an icy windowpane or to detect the probability of ice on the windowpane, using the temperature signal of at least one temperature sensor that is already present or integrated in the sensor device, for example in a lidar or radar sensor. The sensor device is arranged on or near the windowpane of a vehicle. Therefore, the temperature sensor is preferably a temperature sensor that is integrated in the sensor device. The temperature sensor integrated in the sensor device or the internal temperature sensor can essentially be integrated in the sensor device in order to measure the operating temperature of the sensor device and therefore in particular to prevent overheating of the sensor device during operation, wherein overheating is, for example, prevented by adapting the intensity and/or amplitude and/or frequency of the emitted radiation on the basis of the temperature signal output by the at least one internal temperature sensor, or by providing a cooling device.

The temperature signal used to detect ice or the probability of ice on a vehicle window according to the invention is therefore produced by means of at least one temperature sensor that is arranged or integrated e.g. on a printed circuit board of the sensor device, wherein the internal temperature sensor is essentially arranged in the sensor device because of another problem or to perform at least one further function, as described above, in particular to detect whether high temperatures are exceeded inside the sensor (in order to prevent overheating). According to the invention, the sensor device can also comprise more than just one internal temperature sensor, in particular for monitoring the operating temperature. In this case, the temperature signals of several internal temperature sensors can be used to detect ice or the probability of ice.

The proposed approach, i.e. to deduce the presence or probability of ice on the vehicle window from the internal temperature signal of the sensor device, has, for example, the advantage of measuring the temperature precisely where the sensor device is located in the vehicle and "looks" through the vehicle window, i.e. right in the housing of the sensor device and immediately behind the part of the windscreen through which light is emitted and reflected light is received. The fact that the temperature sensor is already integrated in the sensor device allows costs to be saved, for example compared to an approach where an additional (external) temperature sensor is provided. A further advantage of the use of the internal or integrated temperature sensor according to the invention, compared to the use of external temperature information, is that the internal temperature provides much more realistic information regarding the absence of ice in front of the sensor device. An external temperature sensor can be arranged quite far away from the sensor device, e.g. in one of the rear-view mirrors, and show negative temperatures while the part of the vehicle window behind which the sensor device is arranged is already free from ice. If the internal temperature is used, the actual situation can be assessed much more realistically since internal temperatures above the freezing point mean there is a high probability that the sensor device or the relevant part of the vehicle window is free from ice.

The internal temperature signal can in particular be used when the vehicle is started. In this case, the essential advantage is that at start-up of the motor, the operating temperature of the sensor device has little or no effect on the temperature detected by means of the at least one internal temperature sensor, i.e. in case of negative outdoor temperatures at the time the vehicle is started, these will in fact be shown by the temperature sensor.

The temperature within the sensor housing of the sensor device typically increases as the vehicle continues to be in operation, and can reach positive values although the outdoor temperatures are constantly negative. This warming-up within the sensor housing and the driving behaviour of the driver will gradually cause the ice on the windscreen in front of the sensor device to disappear, for example if a passenger compartment heating system or a windscreen wiping system is activated.

The sensor device is preferably started with a so-called winter calibration if the internal temperature sensor measures a temperature below zero degrees (° C.) or a temperature slightly above zero degrees (e.g. 1, 2 or 3° C.), in particular at start-up of the motor. Said winter calibration preferably causes one or more detection threshold(s) (intensity or relevance threshold(s)) for relevant objects during signal processing to be increased, i.e. one or more threshold(s), for example for the intensity of the reflected light, from which a reflecting object is classified as a relevant obstacle.

The sensor device can be switched back to a normal calibration (e.g. a calibration for an ice-free vehicle window) and therefore to the normal detection thresholds for relevant objects during signal processing after an adjustable period of time (e.g. three, four, five or more minutes), in particular when the temperature determined by means of the internal temperature sensor exceeds the freezing point or a defined positive temperature threshold (e.g. 2 or 3° C. or 4 or 5° C.).

If time intervals are introduced during which the lower sensitivity (higher detection thresholds) continues following start-up of the vehicle in case of temperatures below zero or slightly above zero, the number of use cases that are solved with sufficient success is only reduced during these periods of time. This means, said lower sensitivity will only be relevant during a limited period of time, while the overall situation is significantly improved in terms of statistics.

Preferred embodiments relating to the use of the internal temperature signal are proposed below:

a) Use of the internal temperature sensor or the internal temperature signal of a sensor device to detect whether there is frost when the vehicle is started or starts moving (e.g. temperatures <0° C., <3° C., <4° C.) and therefore whether there is a high probability of ice on the vehicle window. In case of negative temperatures at start-up of the vehicle, one or more increased detection threshold(s) are be used during a defined period of time.

The period of time during which the one or more increased detection threshold(s) is/are used can be a constant value and/or a function of another parameter, in particular the temperature at start-up. If the period of time is for example configured as a function of the temperature at start-up, the period of time for the increased detection thresholds can be selected the longer the lower the internal temperature signal is when the vehicle or the system is put into operation. This can be represented by the following formula:

$$t_{increased\ detection\ threshold} = f(T_{at\ time\ of\ start-up})$$

wherein $t_{increased\ detection\ threshold}$ refers to the period of time during which the increased detection threshold is used and $T_{at\ time\ of\ start-up}$ refers to the temperature measured internally at the time of system start-up.

b) Use of the internal temperature sensor or the internal temperature signal as in a) above. In case of negative temperatures or temperatures slightly above zero degrees at start-up of the vehicle, an increased detection threshold is used during a defined period of time and until a positive temperature is exceeded or a positive temperature signal is produced (e.g. temperature above 0° C. or 1° C. or 2° C. or 3° C. or 4° C.).

c) Use of the internal temperature sensor or the internal temperature signal as in a) or b) above. A higher accuracy of the internal temperature is achieved using grid points in a non-volatile memory, in particular around the freezing point (0 degrees Celsius). The use of grid points is particularly advantageous if the temperature sensor does not show a linear representation of the real temperature. The method using grid points can be illustrated according to FIG. 1, including the grid points T1 to T6, and the representation curve ABK of the temperature sensor.

According to FIG. 1, the grid points (e.g. T1 to T6) define sections, and corresponding formulae for determining the real temperature value $T_{real}$ from the measured value $T_{mess}$ are as follows:

$$T_{real} = \frac{y_{T6} - y_{T5}}{x_{T6} - x_{T5}} \cdot T_{mess} + T5$$

for [T5≤$T_{mess}$<T6]

$$T_{real} = \frac{y_{T5} - y_{T4}}{x_{T5} - x_{T4}} \cdot T_{mess} + T4$$

for [T4≤$T_{mess}$<T5]

$$T_{real} = \frac{y_{T4} - y_{T3}}{x_{T4} - x_{T3}} \cdot T_{mess} + T3$$

for [T3≤$T_{mess}$<T4]

$$T_{real} = \frac{y_{T3} - y_{T2}}{x_{T3} - x_{T2}} \cdot T_{mess} + T2$$

for [T2≤$T_{mess}$<T3]

$$T_{real} = \frac{y_{T2} - y_{T1}}{x_{T2} - x_{T1}} \cdot T_{mess} + T1$$

for [T1≤$T_{mess}$<T2]

d) Use of the internal temperature sensor or the internal temperature signal as in a), b) or c) above. Use of a hysteresis (e.g.

a defined period of time) for switching from the normal to the increased detection thresholds for relevant objects and vice versa, in particular if the internal temperature is also taken into account, as in case b). In case b), increased detection thresholds for relevant objects are used at first, following start-up of the vehicle at a negative internal temperature or at an internal temperature slightly above zero degrees; therefore, the system can return to a normal calibration for the detection thresholds for relevant objects after a defined period of time and if at the same time the internal temperature exceeds a positive threshold.

If the internal temperature of the sensor device falls below a lower temperature threshold (again) and the internal temperature sensor delivers a corresponding internal temperature signal, for example at temperatures below zero degrees (° C.), in particular after exceeding the freezing point during previous operation, the system preferably switches back to the calibration using the increased detection thresholds for relevant objects (again), in particular with a hysteresis.

Figure 2:
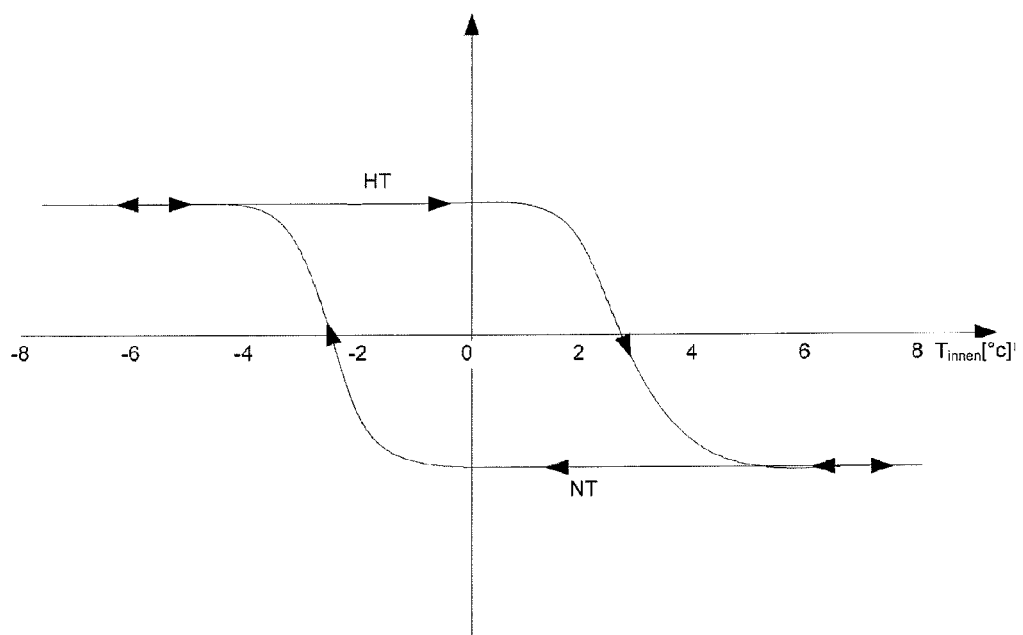

FIG. 2 shows an exemplary configuration including different detection thresholds, i.e. different thresholds from which an object is qualified as a relevant obstacle, wherein the height of the detection thresholds depends on whether there is ice on the vehicle window or there is at least a probability of ice on the vehicle window.

FIG. 2 shows a first curve HT with an increased limit or threshold and a second curve NT having a normal limit or threshold.

$T_{innen}$=temperature inside the sensor housing of the sensor device, which is determined by means of at least one internal/integrated temperature sensor.

The invention claimed is:

1. A method for adapting a signal processing of at least one sensor device that is arranged behind a windowpane in a motor vehicle, wherein the adaptation of the signal processing comprises:
   providing a temperature signal from at least one temperature sensor integrated in the sensor device,
   determining that a probability of ice on the windowpane is detected on the basis of the temperature signal, and
   changing at least one detection threshold of a vehicle obstacle detection system if the probability of ice on the window pane is detected.

2. The method according to claim 1, wherein the at least one temperature sensor is integrated in the sensor device to perform at least a continuous determination of an operating temperature of the sensor device.

3. The method according to claim 1, wherein the temperature signal of the at least one temperature sensor is only used to detect the probability of ice on the windowpane when the motor vehicle is started.

4. The method according to claim 2, wherein the continuous determination of the operating temperature of the sensor device is to prevent overheating.

5. The method according to claim 1, wherein the change of the at least one detection threshold continues for a predefined period of time.

6. The method according to claim 1, wherein a hysteresis is used for switching from a normal to an increased detection threshold for relevant objects and vice versa.

7. The method according to claim 1, wherein the vehicle obstacle detection system is at least one of driver assistance system, an Adaptive/Active Cruise Control system and a braking assistance system.

8. A sensor device that is arranged behind a windowpane in a motor vehicle, including an integrated temperature sensor and a memory in which is stored a method for adapting a signal processing of the sensor device, the method comprising:
   providing a temperature signal from the integrated temperature sensor,
   determining that a probability of ice on the windowpane is detected on the basis of the temperature signal, and
   changing at least one detection threshold of a vehicle obstacle detection system if the probability of ice on the window pane is detected.

9. The sensor device according to claim 8, wherein the vehicle obstacle detection system is at least one of driver assistance system, an Adaptive/Active Cruise Control system and a braking assistance system.

\* \* \* \* \*